(12) United States Patent
Hitelman et al.

(10) Patent No.: US 12,067,893 B2
(45) Date of Patent: Aug. 20, 2024

(54) TRAINING FOR NEW BEHAVIORS

(71) Applicant: Wide Therapy LTD., Herzliya (IL)

(72) Inventors: Rinat Hitelman, Herzliya (IL); Roni Singler, Tel-Aviv (IL)

(73) Assignee: Wide Therapy LTD., Herzliya (IL)

( * ) Notice: Subject to any disclaimer, the term of this patent is extended or adjusted under 35 U.S.C. 154(b) by 19 days.

(21) Appl. No.: 17/966,514

(22) Filed: Oct. 14, 2022

(65) Prior Publication Data

US 2023/0118329 A1 Apr. 20, 2023

Related U.S. Application Data

(60) Provisional application No. 63/256,262, filed on Oct. 15, 2021.

(51) Int. Cl.
*G09B 5/00* (2006.01)
*G09B 5/06* (2006.01)
*G09B 19/00* (2006.01)

(52) U.S. Cl.
CPC .......... *G09B 19/003* (2013.01); *G09B 5/065* (2013.01)

(58) Field of Classification Search
CPC .............................. G09B 19/003; G09B 5/065
USPC ........................................................ 434/236
See application file for complete search history.

(56) References Cited

U.S. PATENT DOCUMENTS

| | | | | |
|---|---|---|---|---|
| 8,393,904 B2 * | 3/2013 | Katz | ........................ | G09B 5/00 434/236 |
| 9,399,111 B1 * | 7/2016 | Hanina | ................. | A61M 21/02 |
| 2005/0074731 A1 * | 4/2005 | Brazil | .................... | G09B 19/00 434/236 |
| 2007/0184421 A1 * | 8/2007 | Tofler | ..................... | G09B 19/00 434/236 |
| 2007/0264622 A1 | 11/2007 | Bajer et al. | | |
| 2010/0297591 A1 * | 11/2010 | Gengler | .................. | G09B 5/00 434/236 |
| 2013/0046206 A1 * | 2/2013 | Preminger | ............... | A61B 5/16 600/595 |
| 2014/0370470 A1 | 12/2014 | Aristizabal et al. | | |
| 2016/0104385 A1 * | 4/2016 | Alam | ....................... | G09B 5/00 434/236 |
| 2017/0352283 A1 | 12/2017 | Lau | | |
| 2018/0137771 A1 * | 5/2018 | Wahidy | .................. | G06N 5/022 |

(Continued)

OTHER PUBLICATIONS

International Search Report and Written Opinion for PCT/IB2022/059890 mailed Jan. 6, 2023, 11pgs.

*Primary Examiner* — Peter R Egloff
(74) *Attorney, Agent, or Firm* — Merchant & Gould P.C.

(57) ABSTRACT

The disclosed behavior training system and method uses a combination of modified video self-modeling techniques, generalization and applied behavior analysis techniques to effectively teach new target behaviors. According to an embodiment, a system and/or method includes: receiving a selection of a target behavior; constructing a visual representation of a user environment, sending, to the user electronic computing device, the constructed visual representation of the user environment, generating a behavioral clip related to performing the target behavior, receiving a selection of the stimulus object and in response to receiving the selection of the stimulus object, sending, to the user electronic computing device, the generated behavioral clip and one or more rewards to encourage the user to continue to engage with the behavior training system.

20 Claims, 11 Drawing Sheets

(56) References Cited

U.S. PATENT DOCUMENTS

| | | | |
|---|---|---|---|
| 2018/0260448 A1* | 9/2018 | Osotio | G06F 16/24575 |
| 2019/0015033 A1 | 1/2019 | Sahin | |
| 2019/0320964 A1* | 10/2019 | Matto | A61B 5/0022 |
| 2020/0090542 A1* | 3/2020 | Clevenger | G09B 5/065 |
| 2020/0276408 A1 | 9/2020 | Hill et al. | |

* cited by examiner

TRAINING FOR NEW BEHAVIORS

CROSS-REFERENCE TO RELATED APPLICATIONS

This application claims priority from U.S. Provisional Application No. 63/256,262, filed Oct. 15, 2021, the disclosure of which is hereby incorporated by reference in its entirety.

BACKGROUND

Behavior is the actions and mannerisms made by an individual in conjunction with themselves or the individual's environment. Humans possess the ability to learn new behaviors. Some learning may be immediate, induced by a single event. However, most learning is based on knowledge accumulated over time and repeated experiences. Learning a new behavior is a complicated process that often requires repeated effort and practice.

SUMMARY

Embodiments of the disclosure are directed to a behavior training system that uses a combination of applied behavior analysis and modified video self-modeling to enable a user to achieve execution of new behaviors.

In a first embodiment a computer-implemented method for training a user on teaching a target behavior is disclosed. The method comprises: receiving, from a user electronic computing device, a selection of the target behavior; constructing a visual representation of a user environment, wherein the visual representation of the user environment includes at least one stimulus object; sending, to the user electronic computing device, the constructed visual representation of the user environment; determining a sequence of steps for the target behavior; generating a behavioral clip related to performing the target behavior, the behavioral clip including a visualization of some but not all of steps of the determined sequence of steps; receiving a selection of the stimulus object; and in response to receiving the selection of the stimulus object, sending, to the user electronic computing device, the generated behavioral clip.

In a second embodiment a system for training a user on a target behavior is disclosed. The system comprises: a processor; memory comprising instructions that when executed by the process causes the processor to: receive, from a user electronic computing device, a selection of the target behavior; construct a visual representation of a user environment, wherein the visual representation of the user environment includes at least one stimulus object; send, to the user electronic computing device, the constructed visual representation of the user environment; determining a sequence of steps for the target behavior; determine a sequence of steps for the target behavior; generate a behavioral clip related to performing the target behavior, the behavioral clip including a visualization of some but not all of steps of the determined sequence of steps; receive a selection of the stimulus object; and in response to receiving the selection of the stimulus object, send, to the user electronic computing device, the generated behavioral clip.

In a third embodiment, a system for training a user on a target behavior is disclosed. The system comprising: a display device; a processor; memory comprising instructions that when executed by the process causes the processor to: display the behavior training user interface on the display device that includes one or more user selectable options associated with a target behavior; receive, from the user, one or more selections associated with the target behavior; send the one or more selections associated with the target behavior to a server computing device; receive, from the server computing device, a constructed visual representation of a user environment, wherein the constructed visual representation of the user environment includes at least one stimulus object; display, on the display device, the constructed visual representation of the user environment and a prompt requesting the user to trigger the stimulus object; receive, from the user, a selection of the stimulus object; send the selection of the stimulus object to the server computing device; in response to sending the selection of the stimulus object, receive a behavioral clip related to performing the target behavior, wherein the behavioral clip does not include content related to performing all steps of the target behavior; display and cause the automatic playback of the behavioral clip on the display device; in response to sending the selection of the stimulus object, receive one or more rewards; and display the one or more rewards on the display device to encourage the user to continue to engage with the behavior training user interface.

The details of one or more techniques are set forth in the accompanying drawings and the description below. Other features, objects, and advantages of these techniques will be apparent from the description, drawings, and claims.

BRIEF DESCRIPTION OF DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
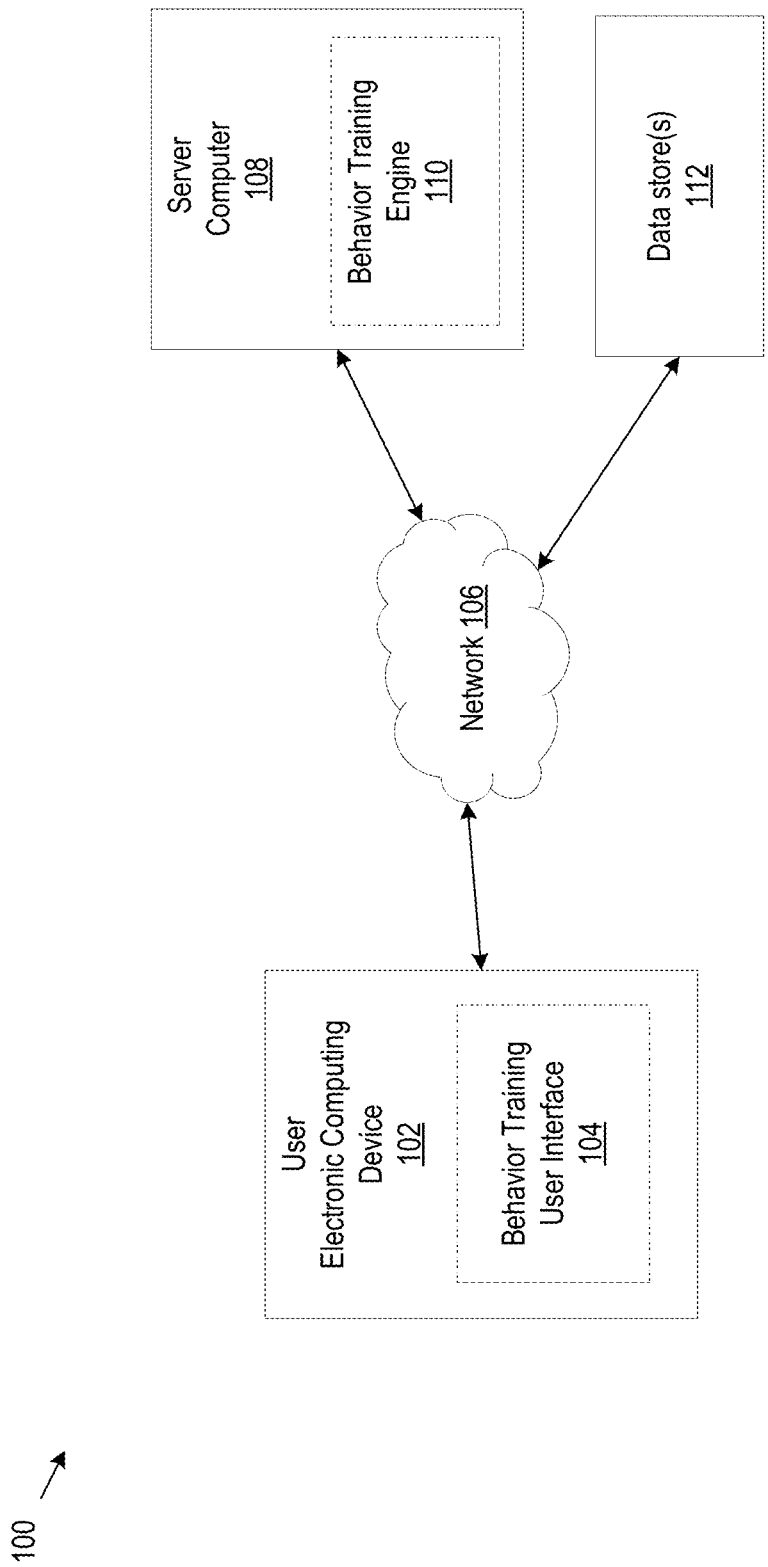
FIG. 1 illustrates an example configuration of a behavioral learning system according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the subject matter of the present disclosure relates to a platform to learn new behaviors that enables users to achieve the execution of new behaviors in real life using a combination of applied behavior analysis principles, generalization and modified video self-modeling principles.

Individuals often experience difficulty when learning a new behavior. In some cases, the difficulty may be due to the user experiencing cognitive rigidity, which is the inability to mentally adapt to new demands or information. In other examples, the disclosed behavior training system can be used to help users with other types of disabilities such as autism, attention deficit/hyperactivity disorder, intellectual disability. Further still, even users not experiencing cognitive or behavioral rigidity or disabilities may still experience difficulties learning a new behavior because different users have different ways of learning based on the user's characteristics, diagnosis, function and age. For example, the difficulty may be simply due to the complex nature of the behavior, inability to imitate, cognitive understanding of reason-result or social understanding of the behavior.

The difficulty in learning a new behavior may or may not be associated with a disability. Often, individuals need to learn a particular behavior due to environmental, social, medical, and/or developmental reasons. Other reasons for learning behaviors are also possible. A system to help train such a user on a new behavior would help individuals having difficulty learning new behaviors.

In one example, a user with a medical condition may need to learn a new behavior associated with wearing equipment for treating or rehabilitating the condition. For example, a user may need to wear a helmet for rehabilitation purposes. However, users do not always wear a helmet to protect themselves in cases of head banging due to sensory issues or lack of understanding or ability to visualize the benefits of wearing a helmet. In another examples, a user may need to unlearn a particular learned behavior by learning a new replacement behavior. A user may need to learn how to move from one place to another, transition to a new activity, give/take a toy or play item, use the toilet and not to engage in food selectivity, violence, or self-injury. Other examples associated with learning a new behavior are also possible.

In another example, a child that is younger in age, or a child that exhibits strong cognitive rigidity or other behavioral characteristics may have difficulty entering a new space, toilet training, coping with environmental changes, wearing new items of clothing, or sharing items with others. Typically, the user characteristics that make it difficult to learn new behaviors may be improved with therapeutic techniques in a clinical setting such as through video self-modeling and chaining.

Video self-modeling is a therapeutic technique used to teach users new behaviors or skills that includes using a video recording as a model. The new behavior or skill that the user has not mastered or learned yet, but the user or the user's caregiver desires for the user to learn may be referred to as a "target behavior." In video self-modeling, a user may be shown a video recording of themselves successfully performing all the steps associated with a target behavior in order to successfully complete the target behavior or skill at a later time, for example without the benefit of the video recording.

For example, if the target behavior was to drink out of a cup, the video of the user moving their hand to the cup, gripping the handle of the cup, picking up the cup, moving the cup to their mouth, and sipping out of the cup may be shown to the user on video. The video of the user performing the target behavior is typically produced by first acquiring a video of the user performing the target behavior with the assistance of a caregiver or a third-party and using video editing software to remove the caregiver or third-party from the video such that the resulting final video appears to show the user perform the target behavior independently. Video self-modeling is used to help the user learn the steps to successfully achieve the target behavior. However, showing the sequence of steps to achieve the target behavior may take a long period of time before the user is able to successfully complete the target behavior or skill. For example, individuals in the autism spectrum may have difficulty focusing on a video uninterrupted and/or for long periods of time, may get confused when a behavior involves several steps, and may get hung up or stuck on minor and/or non-essential details within a video recording.

Generalization is another technique to teach a user a new behavior. Generalization is the ability of a learner to perform a skill or new behavior under different conditions (stimulus generalization), the ability to apply the skill in a different way (response generalization) and also to continue to exhibit the skill over time (maintenance). Generalization is a way to teach a new behavior such that the user learns the behavior itself outside the constructs of the environment and stimulus. For example, if a user is continuously taught to use the bathroom by showing the user pictures and videos of the user's primary bathroom located within the user's house, where the primary bathroom includes a yellow tile floor, blue wallpaper, with the sink located to the left of the toilet and the door to the bathroom located to the left of the sink, the user may get used to the environmental cues and struggle to use a bathroom at the user's school, wherein the bathroom environment may look different.

Generalization provides a way for the user to learn the behavior of, for example, going to the toilet itself without needing the environmental cues associated with a single bathroom environment. In other words, generalization provides a way for the user to learn the behavior of going to the toilet irrespective the environment the toilet is located in.

One way that generalization can be applied is by changing the environment and stimuli associated with the target behavior. For example, when training a user for a new behavior, the environmental cues and the stimulus may be varied periodically or at a pace based on the user's advancement in learning the target behavior that allows the user to learn the behavior without being reliant on the environmental cues to initiate or complete the behavior.

Chaining is yet another technique to teach a user a new behavior that is based on task analysis. Chaining breaks a task down into small steps and then teaches each step within the sequence by itself. For example, an individual trying to learn to wash their hands may start with learning to turn on the faucet. Once this initial skill is learned, the next skill may be to put their hands in the water. Chaining may be useful in assisting individuals with routine tasks. However, chaining may also require longer time periods for the individual to master a target behavior because of the technique's emphasis on the individual mastering of each step associated with the behavior in sequence.

In some embodiments, the disclosed behavior training system uses a combination of modified video self-modeling techniques, generalization and applied behavior analysis techniques to effectively teach new behaviors. For example, the disclosed behavior training system may be a computer implemented platform that is accessible to the user using an electronic computing device. The disclosed behavior training system may construct a visual representation of the user's real life environment using photographs or digital representations of the user's environment and photographs or digital representations of the user and, optionally, the user's therapist(s), caregiver(s), parents, friends, teachers, or any other individuals that may be part of or helpful in the process of the user learning a target behavior.

Further, the disclosed behavioral learning platform may teach the new behavior to users by reinforcing the new behavior on the platform rather than reinforcing the behavior when the behavior is performed in real-life. For example, the disclosed behavioral learning platform may use a novel approach to the principles of Differential Reinforcement of Alternative Behavior by reinforcing a different behavior, such as the user's engagement with the behavioral learning platform that shows the user's digital likeness accomplishing the behavior, rather than the user's behavior in real-life to help achieve real-life change in the user.

For example, the behavior training system may use the photographs or digital representations of the user and the user's real-life environment to construct a visual representation of the user within the constructed environment. The behavior training system may then show a video of the visual representation of the user starting to perform the target behavior. However, instead of showing all of the steps needed to complete the target behavior, as in video self-modeling, the behavior training system may, for example, skip one or more intermediate steps, or simply show the visual representation of the user performing the last step of the target behavior or the visual representation of the user completing the target behavior.

The behavior training system encourages the user to interact with the constructed environment as a first step in mastering the targeted behavior. In some examples, the behavior training system may use personalized rewards to reinforce the user's progress towards successfully learning a target behavior.

For example, for a target behavior of drinking from a cup, the behavior teaching platform may display an image of the user's environment with an image of the user within the displayed environment. The behavior teaching platform, upon receiving a trigger, may show the image of the user walking towards a cup on a table in the constructed environment. The prompt may be used for the user to understand what stimulus triggers the behavior. In the case of the target behavior of drinking from a cup, the prompt may include the user touching, clicking or otherwise selecting the image of the cup on a display screen that displays the constructed environment After the image of the user reaches the cup, the behavior teaching platform may transition directly to an image or a short video click of the image of the user already drinking from the cup. According to this example, the intermediate steps of the user grabbing the handle of the cup, picking up the cup from the table and moving it close the user's mouth are not shown.

In some examples, the behavior teaching platform may prompt the user to trigger the stimulus using visual or auditory cues. For example, in the case of the target behavior of drinking from a cup, the size of the cup may be increased so that it appears disproportionately large for the constructed environment. Increasing the size of the object may intuitively make the user select or otherwise interact with the object, thus triggering the stimulus. The type of prompt may also be personalized to the user based on the user's past behavior.

In some examples, the behavior teaching platform may also provide personalized rewards as reinforcement for the user triggering the stimulus. Example rewards include, but are not limited to, stickers, emoticons, digital points, video clips from the user's favorite television program or movie, video clips of the user's family or friends, video clips of the use's mother laughing and other well-known rewards. In addition to the different types of reward options, the behavior teaching platform may also provide multiple tiers of rewards such that the user may be presented with a higher tier rewards as the user makes advances in learning the target behavior in real life.

For example, a reward that provides positive reinforcement for one user may not always work as a positive reinforcement with another user. Similarly, a type of prompt that works with one user may not always work with another user. Thus, the behavior teaching platform is capable of determining the type of prompt(s) and/or reward(s) that better promote triggering of the stimulus based on the likes of the particular individual user.

The behavior teaching platform may use artificial intelligence and machine learning to learn the types of prompts and rewards that are likely to work for users in general as well as what is likely to work for the particular user, as well as the types of prompts and/or rewards that are more likely to work for certain types of target behaviors as opposed to others. The artificial intelligence and machine learning models used by the behavior teaching platform may also study the effect of a user's age, real-life environment, type of diagnosis, level of function, type of user equipment used, etc. on the pace and success of the user learning a new target behavior. The artificial intelligence and machine learning models may then use the gathered data in predicting ways to improve the constructed and real-life environments, prompts, and rewards in order to improve the pace at which the user learns the target behavior. In other words, the artificial intelligence and machine learning models may be used by the behavior teaching platform to construct a platform that is personalized to improve the chances of the particular user successfully learning a new behavior and doing so at a faster pace.

In addition to the personalized triggers and prompts, the behavior teaching platform may also use machine learning and artificial intelligence to learn about the user's interactions with the behavior teaching platform. For example, the behavior teaching platform may learn that the particular user gets distracted by all the elements within a constructed environment, for example, other objects in the room, and misses or takes too long to trigger the stimulus. In such a case, the behavior teaching platform may remove elements within the constructed environment to help focus the user's attention on the prompt.

FIG. 1 illustrates an example configuration of a behavior training system 100. The system 100 includes a user electronic computing device 102, a network 106, a server computer 108 and one or more datastores 112. In some examples, the server computer 108 may include a behavior training engine behavior training engine 110. More, fewer, or different modules can be used.

In some examples, user electronic computing device 102 is an electronic computing device of the user. In some examples, the electronic computing device can be a desktop computer, a laptop computer, virtual reality user device, or a mobile electronic computing device such as a smartphone or a tablet computer. In some examples, the user electronic computing device 102 permits the user to access the server computer 108 over a network 106 and display data on a behavior training user interface 104. In some examples, the user may be an individual that is experiencing cognitive rigidity. In other examples, the user may be an individual that is experiencing ADHD. In yet other examples, the user may not have any cognitive issues at all and may be experiencing difficulty learning a new behavior. The user may be suffering from an autism spectrum disorder or the user may be an individual seeking to attain increased cognitive flexibility. Although a single user electronic computing device 102 is shown, the system 100 allows hundreds, thousands, or more computing devices to connect to the server computer 108.

In some examples, the network 106 is a computer network, such as the Internet. The user on the user electronic computing device 102 can access the server computer 108 via the network 106.

As a non-limiting example, the server computer 108 is a server computer of an entity, such as an entity providing services related to improving cognitive flexibility. Although a single server is shown, in reality, the server computer 108 can be implemented with multiple computing devices, such as a server farm or through cloud computing. Many other configurations are possible, as will be apparent to one of skill in the pertinent art.

In one example, the behavior training engine 110 is configured to receive input related to the user's environment and a target behavior that the user wishes to achieve, or the user's therapist(s) or caregiver(s) wishes the user to achieve, and the behavior training engine 110 is configured to generate and present one or more behavioral clips in response to a stimulus that helps the user learn the desired behavior. The implementation of the behavior training engine 110 is described in further detail in relation to FIGS. 2-11.

The example datastore 112 may include one or more electronic databases that can store data related to the user and/or behavior training engine 110. The datastore 112 may be maintained by the same entity that maintains the server computer 108 or one or more external enterprises associated with the entity that maintains the server computer 108. The datastore 112 can be accessed by server computer 108 to retrieve relevant data associated with the user and the behavior training engine 110. The datastore 112 can be accessed by server computer 108 to retrieve relevant data on multiple users in order to determine the types of prompts and/or rewards that are more likely to work for certain types of target behaviors as opposed to others based, for example, on the success rate of those prompts and/or rewards among a group of users in the system.

Figure 2:
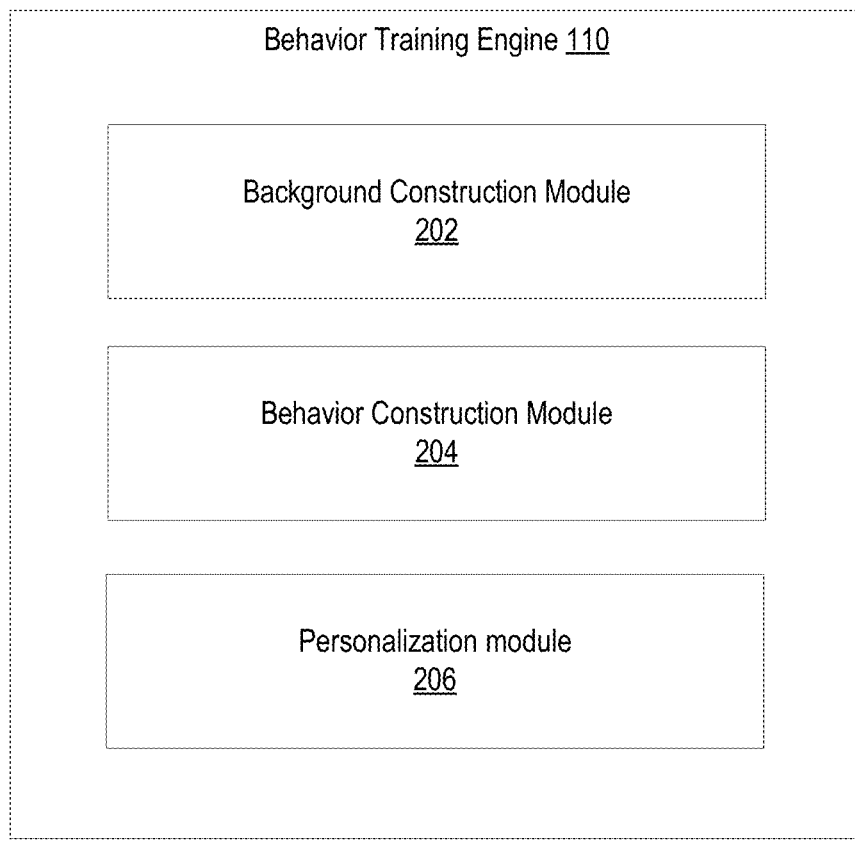
FIG. 2 illustrates an example configuration of the behavior training engine of the system of FIG. 1.

FIG. 2 illustrates an example configuration of the behavior training engine 110 of FIG. 1. In some examples, the behavior training engine 110 may be configured to include a background construction module 202, a behavior construction module 204 and a personalization module 206. In other examples, the behavior training engine 110 may be configured to include more or fewer modules.

In some examples, the background construction module 202 is configured to receive input data from the user electronic computing device 102 related to the user's background, including information related to the user's preferences and the user's environments. For example, the background construction module 202 may be configured to generate a behavior training user interface 104 for display on the user electronic computing device 102.

The background construction module 202, through the generated behavior training user interface 104, may request the user, or the user's therapist(s) or caregiver(s), to input information related to the user and the user's environment. For example, the requested data may include information about the user, including information related to the user's name, age, background information, such as current cognitive abilities, rigidity levels, information related to user's social skills, user's health history, user's preferences, information related to the user's care provider, user's diagnosis, functioning level of the user, etc.

In addition, the background construction module 202, through the generated behavior training user interface 104, may also request the user, or the user's therapist(s) or caregiver(s), to provide one or more photographs or digital representations of the user's primary environment and one or more photographs or digital representations of the user. For example, the one or more photographs or digital representations of the environment may include photographs or digital representations of the primary room in which the user spends time in within the user's home. The photographs or digital representations may also include all other environments associated with the user, such as rooms within the user's home, user's school, workplace, playground, vehicles the user uses, etc.

The background construction module 202, using the photographs or digital representations received from the user, or the user's therapist(s) or caregiver(s), constructs a visual representation of the user's primary environment with the user located within the primary environment. For example, if the user spends a significant amount of time in a pre-school classroom, the constructed primary environment may include a photograph or digital representation of the pre-school classroom with a photograph or digital representation of the user overlaid within the image of the pre-school classroom. Similar constructions of other user related environments may also be generated and stored in the data store 112.

The background construction module 202 may take into account the user's age, diagnosis and functioning level while constructing the constructed environment. For example, for a user with a lower functioning level, the background construction module 202 may construct a constructed environment that may not include all objects that would be present in the counterpart real-world environment. Instead, the background construction module 202 may create a constructed environment that is simple and clear of objects that are deemed too distracting for the user. For a user with a higher functioning level, the background construction module 202 may construct a constructed environment that may include a majority of objects, if not all of the objects, found in the counterpart real-life environment.

The constructed environment typically uses photographs or digital representations of the real environment and real photographs or digital representations of the user rather than creating a cartoon or a recreation of the environment or the user. In these preferred embodiments, using a realistic visual representation of the user and the user's environment helps the user relate to and engage with the constructed environment. An example environment constructed by the background construction module 202 is described in further detail in relation to FIG. 5.

In some examples, the behavior construction module 204 is configured to receive input data from the user electronic computing device 102 related to the target behavior that the user him/herself is trying to achieve, or the user's therapist(s) or caregiver(s) would like the user to achieve. Based on the received input regarding the target behavior, the behavior construction module 204 may select, adjust and personalize the constructed environment for the target behavior and user, generate a behavioral clip associated with the target behavior, prompt the user to trigger the playback of the behavioral clip, cause the playback of the behavioral clip and generate personalized rewards when the user successfully engages with the constructed environment and behavioral clip. User engagement may include the user interacting with the behavioral clip in any way, including digital interactions such as mouse clicks or touch inputs associated with the behavioral clip or real-life interactions such as the user viewing, touching, or otherwise interacting with the display of the behavioral clip or making attempts to copy the behavior exhibited within the behavioral clip. The configuration and operation of the behavior construction module is described in greater detail in relation to FIG. 3.

In some examples, the personalization module 206 may be configured to use historical data from a particular user, artificial intelligence and/or machine learning models to personalize elements of the constructed environment, prompts and rewards for the particular user.

For example, the personalization module 206 may use historical data related to a particular user in order to inform whether different elements for the constructed environment, different prompts, or different rewards would lead to more progress by the particular use to learn the behavior at issue. For example, the personalization module 206 may analyze historical data related to the type elements used for the constructed environment, the type of prompts used to initiate engagement from the particular user and the types of rewards offered for successful completion of a part of or the whole target behavior. When the personalization module 206 detects a lag or delay related to the particular user's progress in learning a target behavior, the personalization module 206 may modify the types of elements used for the constructed environment, the types of prompts used to initiate engagement from the particular user and the types of rewards for successful completion of a part of or the whole target behavior.

For example, a particular user working on a target behavior, such as potty training, may experience progress and lags. The personalization module 206 may track the user progress data in relation to the types of elements used in the constructed environment, the types of prompts used, and rewards presented to the particular user in order to determine what works and what does not. Based on this determination, the personalization module 206 may modify the types of elements used in the constructed environment, the types of prompts to initiate engagement, and the types of rewards offered for successful completion of parts of or the whole target behavior. The personalization module 206 may also adjust how the elements for constructing the environments, the prompts, and the rewards are modified based on the functional level of the user. For example, the personalization module 206 may adjust how the types of elements used in the constructed environment, the types of prompts to initiate engagement, and the types of rewards offered for successful completion of parts of or the whole target behavior are modified based on whether the particular user is high-functioning or low-functioning.

For example, the machine learning model may be trained to predict which prompts, environmental configurations and rewards result in successful user engagement. When a user experiences difficulty in engaging with the constructed environment or selecting the stimulus, the prompt may be modified according to what is predicted by the machine learning model to result in successful engagement from the particular user.

The machine learning model may be trained to learn what elicits a successful engagement from the particular user, what works for an average user of the behavior training system 100 and what works for the particular type of target behaviors. The machine learning model may then provide input to personalize the constructed environment, including the prompts, elements within the environment and rewards to improve user engagement.

For example, some users may respond to text prompts, while others respond to audio prompts, while others still may respond to visual prompts or a combination of different prompts. An example of a text prompt may include a message within a behavior training user interface 104 generated by the behavior training system 100 and displayed on the user electronic computing device 102 asking the user to click on or otherwise select a particular element within the constructed environment, generated by the behavior construction module 204 and displayed on the behavior training user interface 104. An example of an audio prompt may include an audio message prompting the user to make the selection instead of text message. The audio message, in some cases, may include a recording of the care provider. An example of a visual prompt may include an arrow moving and/or pointing toward a selection to be made by the user. Another example of a visual prompt may include enlargement of elements, highlighting of elements, or highlighting by contrast of elements within the behavior training user interface. Other types of prompts are also possible.

In some examples, when the behavior construction module 204 has not received a user selection on the behavior training user interface 104 or any engagement with the behavior training user interface 104 for a threshold amount of time, the behavior construction module 204 may alter the type of prompt displayed on the behavior training user interface 104. For example, if the behavior construction module 204 initially generates a text prompt for the user to select a particular element within the behavior training user interface 104, but has not received a user selection or any other user engagement with the behavior training user interface 104 for a threshold amount of time, then the behavior construction module 204 may alter the prompt to an audio prompt. The threshold amount of time may be variable and can range from a few seconds to several minutes. The threshold amount of time may be personalized to the user based on how long the particular user typically takes to make selections or otherwise engage with the behavior construction user interface 104.

In some examples, the element that serves as a trigger for the playback of the clip generated by the behavior construction module 204 is related to the target behavior. For example, when the target behavior is to drink from a cup, the image of the cup within the constructed environment may serve as the stimulus object. When the target behavior is to toilet train, the image of the toilet within the constructed environment may serve as the stimulus object.

Depending on the user's current levels of function, the user may have difficulty selecting a particular stimulus object within the constructed environment displayed within the behavior training user interface 104. The personalization module 206 may learn the user's limitations and strengths and modify aspects of the stimulus object, the constructed environment, or the types of prompts to increase the probability of the user engaging with the constructed environment and selecting the stimulus object.

For example, the behavior training engine 110 may request the user or the user's caregiver to provide personal information associated with the user. In some examples, the data request may be in the form of a questionnaire presented on the behavior training user interface 104. Other forms of data request are also possible. The personal information may include details regarding the user, such as the user's name, address, age, medical history, educational background, family background, health history, the user's levels of functionality, the user's strengths and weaknesses. Other types of personal information may also be gathered. The behavior training engine 110 may store the received data in the data store 112.

In some examples, the personalization module 206 may retrieve data regarding the user's current levels of function from data store 112 for use with the learning model to modify aspects of the stimulus object, the constructed environment, or the types of prompts to increase the probability of the user engaging with the constructed environment and selecting the stimulus object For example, based on the user's prior behavior, the machine learning model may predict that the user may respond to prompts if the stimulus object is larger in size or if distracting elements within the constructed environment are removed. Accordingly, the personalization module 206 may interact with the behavior construction module to modify and personalize the constructed environment, prompts, rewards and the number of steps used to train the user for the new behavior based on the particular user's preferences, predictions on what types behaviors the particular user would find difficult to learn or types of target behaviors.

Figure 9:
FIG. 9 illustrates an example visual representation of the behavior training user interface of FIG. 1 displaying a modification to elements of the integrated constructed environment.
Figure 10:
FIG. 10 illustrates another example visual representation of the behavior training user interface of FIG. 1 displaying another modification to elements of the integrated constructed environment.

Examples of the personalized constructed environments that may be displayed on the behavior training user interface 104 are described in greater detail in relation to FIGS. 9-10.

Figure 3:
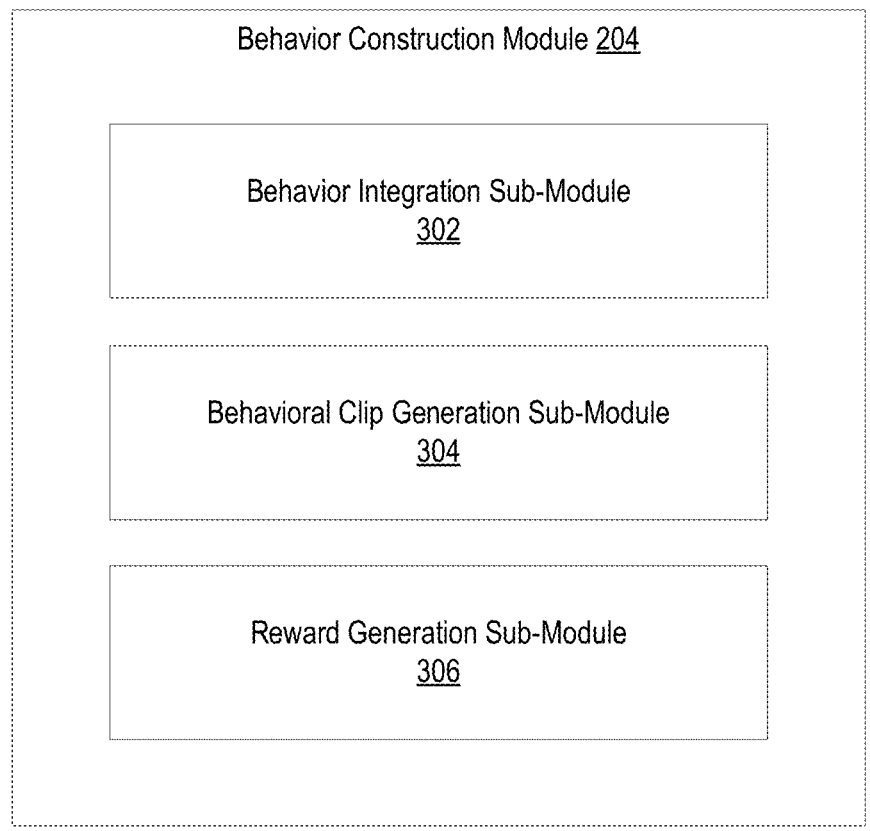
FIG. 3 illustrates an example configuration of the behavior construction module of the behavior training engine of FIG. 2.

FIG. 3 illustrates an example configuration of the behavior construction module 204 of FIG. 2. In some examples, the behavior construction module 204 may be configured to include a behavior integration sub-module 302, a behavioral clip generation sub-module 306 and a reward generation sub-module 308. In other examples, the behavior construction module 204 may be configured to include more or fewer modules.

In some examples, the behavior integration sub-module 302 is configured to receive input data from the user electronic computing device 102 related to the target behavior that the user himself, or the user's therapist(s) or caregiver(s), is trying to achieve. The behavior integration sub-module 302 may cause the behavior training user interface 104 associated with the behavior training system 100 and displayed on the user electronic computing device 102 to display one or more questions and/or options related to the target behavior. For example, the behavior training user interface 104 may require the user, or the user's therapist(s) or caregiver(s), to select a target behavior out of a plurality of pre-compiled list of target behaviors. The behavior training user interface 104 may also require the user, or the user's therapist(s) or caregiver(s), to input additional information related to the target behavior, including the location at which the user is likely to execute the target behavior and photographs or digital representations of each of the locations that the user is likely to execute the target behavior and photographs or digital representations of objects associated with the target behavior at each such location. For example, for a target behavior of toilet training, the user or the user's caregiver may be prompted to upload photographs or digital representations of the user's primary bathroom, such as the user's home bathroom as well as photographs or digital representations of other bathrooms the user is likely to use, such as the user's school bathroom, the user's grandparents' bathroom.

Based on the received input regarding the target behavior, the behavior integration sub-module 302 may select the appropriate constructed environment related to the target behavior that was constructed by the background construction module 202 and stored in the data store 112 The behavior integration sub-module 302 may then adjust the environment constructed by the background construction module 202 to include elements related to the target behavior, including images or digital representations of objects related to the target behavior that were input by the user, or the user's therapist(s) or caregiver(s).

For example, if the target behavior includes learning to sit in a new chair, then the behavior integration sub-module 302 may prompt the user, or the user's therapist(s) or caregiver(s), to provide information regarding where the user would typically execute the target behavior, photographs or digital representations of the location, and photographs or digital representations of, for example, the user's chair. The user's therapist(s) or caregiver(s) may provide the required details and the behavior integration sub-module 302 may use the received information to select the appropriate constructed environment, such as the user's preschool classroom and overlay one or more new elements, such as an image of the new chair, within the image of the constructed environment.

In another example, if the target behavior includes learning to use a toilet, the behavior integration sub-module 302 may select the constructed environment associated with the user's bathroom. The behavior integration sub-module 302 may also select and adjust the constructed environments in other ways depending on the target behavior.

Once the user becomes routinely successful in completing a particular target behavior in real-life environment that matches a primary constructed environment, the behavior integration sub-module 302 may adjust the constructed environments to secondary environments to help the user to learn to accomplish the target behavior in other environments. For example, if the target behavior is to successfully use the toilet, initially the behavior integration sub-module 302 may construct an environment that matches the user's primary environment, which in this case may be the user's home. However, over time, when the user successfully learns to use the toilet within the user's house, the behavior integration sub-module 302 may use principles of generalization to adjust the constructed environment to include other bathroom environments that the user may be exposed to, including the user's school bathroom, the user's grandparents' bathroom, etc.

In some examples, the behavior integration sub-module 302 may also be configured to allocate one or more elements or objects within the constructed environment as being the stimulus object. The behavior integration sub-module 302 may prompt the user to select or otherwise engage with the stimulus object in order to trigger the playback of a behavioral clip. For example, for a target behavior of sitting on a new chair, the stimulus object may be the image of the chair within the constructed environment that is displayed on the behavior training user interface 104. The user selecting or otherwise engaging with the image of the chair on the behavior training user interface 104 may result in the playback of a behavioral clip related to the target behavior. The generation and playback of the behavioral clip is described in greater detail in relation to the behavioral clip generation sub-module 304.

Aspects related to the constructed environment, the prompt and the stimulus object may be modified by the behavior integration sub-module 304 based on the predictions and feedback of the machine learning model configured by the personalization module 206.

Once an appropriate environment is constructed for a selected target behavior, the behavioral clip generation module 306 may be configured to construct a clip of the behavior using the constructed environment. In some examples, a clip may include a sequence of images or a short video snippet of the visual representation of the user within the constructed environment performing, for example, the beginning and ending steps of a target behavior, while leaving out one or more intermediate steps. The images of the user within the clip include the photographic image or other digital representation of the user so that the user, when viewing the clip, can see themselves performing the target behavior within their environment.

In some examples, the behavioral clip generation module 304 may determine the sequence of steps associated with the selected target behavior by accessing data regarding the selected target behavior from the data store 112. For example, the sequence of steps associated with each of the pre-compiled list of target behaviors available for selection with the behavior training system 100 may be retrieved by the behavior training system 100 from internal or external data sources and stored in data store 112.

In one example, the behavioral clip generation module 304 may access the data store 112 to retrieve one or more stock images or video clips associated with the selected target behavior. The behavioral clip generation module 304 may then edit the stock images or video clips to replace the stock image of a user, user's background, stimulus object and other elements within the user's background with images of the particular user, the particular user's background images, the particular user's stimulus object images and images of elements within the particular user's background. Other ways of generating the behavioral clip for a selected target behavior are also possible.

The clip of the target behavior may be constructed such that the clip only includes a subset of the target behavior. In some examples, the subset includes the beginning and the ending of the target behavior. In other examples, the subset includes some, but not all of the intermediary steps. The number of steps included within the clip may be based on the real-life advancement of the user as reported by the user or the user's caregiver. In this embodiment, one or more intermediate steps are not included within the clip. In some examples, streamlining the clips by not including one or more intermediate steps of the target behavior is to limit the length of the clip. Generally, at least a significant subset of users experiencing difficulty learning a new a new behavior, including but not limited to users with cognitive rigidity, such as users in the autism spectrum, may have difficulty focusing on long clips with complicated details. Limiting the clip to the beginning and the ending steps of the target behavior limits confusion and makes it easier for the user to understand the end goal of the behavior. Typically, when the user understands the end goal by watching themselves perform the target behavior successfully, the user gains confidence to attempt and perfect the end goal of the target behavior. In such cases, the intermediate steps associated with the target behavior become easier for the user to achieve without the user seeing each step and/or becoming preoccupied with perfecting each intermediate step.

For example, a clip associated with the target behavior of drinking out of a cup may include a series of images or a short video snippet of only the beginning and ending steps of the target behavior, including: the user's image moving to place their hands around the cup handle and the user's image finishing drinking from the cup. In another example, a clip associated with the target behavior of sitting in a new chair may include a series of images or a short video snippet of the user's image walking towards the new chair and the user's image already sitting on the chair.

The level of detail within the short video snippet, the length of the short video snippet and the number of intermediate steps depicting the target behavior within the short video snippet may be dependent on the user's current functional level as determined by the behavior training engine 110 via reports provided by the user or the user's caregivers related to the user's diagnosis and advancement progress. For example, a user with a lower functional level may require a video snippet depicting a plurality of intermediate steps depicting the target behavior, whereas a user with a higher functional level may only need a video snippet depicting none of the intermediate steps depicting the target behavior.

Upon generating the behavioral clip, the behavioral clip generation sub-module 304 may store the clip in the data store 112. The behavioral clip generation sub-module 304 may cause the playback and display of the behavioral clip on the behavior training user interface display 104 upon receiving a trigger from the user. In some examples, the trigger may include the user selecting or otherwise engaging with the stimulus image on the constructed environment displayed on the behavior training user interface 104. In other examples, other ways of triggering the playback of the behavioral clip are also possible, as will be readily apparent by those skilled in the pertinent field. The user's progress in learning the target behavior may largely depend on the number of the times the user repeats watching and engaging with the generated behavioral clip. Therefore, the behavioral clip generation sub-module 304 may provide reminders for the user or the user's caregiver to trigger the playback of the behavioral clip repeatedly in order to allow the user to view the clip over and over to familiarize themselves with the target behavior as a form of repeated practice.

When the behavioral clip generation sub-module 304 receives an input indicating that the user has engaged with or otherwise selected the stimulus object, the behavioral clip generation sub-module 304 may cause the playback of the generated behavioral clip on the behavior training user interface 104 on the user electronic computing device 102.

For example, in the case of the target behavior of drinking from a cup, the cup itself may serve as a stimulus. Playback of the clip may be triggered upon the user selecting the cup within the displayed constructed environment. The playback of the behavioral clip may include the display of an image or video snippet of the user reaching their hand towards the cup handle followed by a display of an image or video snippet of the user already sipping from the cup.

In some examples, the reward generation sub-module 306 is configured to generate rewards for the user after the user's successful engagement with the constructed environment and triggering of the playback of the behavioral clip. The reward generation sub-module 306 may generate one or more rewards for display on the behavior training user interface 104. A reward may include a digital text, image, audio and/or video object that may positively reinforce the user to continue to engage with the constructed environment. The reward may also encourage the user to mirror the target behavior in real-life. For example, a reward may include an image of the user's favorite cartoon character, an emoticon, an audio clip of hand clapping, a snippet in the Graphics Interchange Format (GIF), images or videos of the user's family or friends and videos of the user's favorite television program or movie. Other types of digital rewards are also possible. Although not necessary for successfully training a user on a new behavior, the disclosed behavior training system may also use external, real-world rewards to incentivize the user. For example, an external, real-world reward may include a point system where the user receives points for certain types of engagements that the user can redeem for prizes. The prizes may include access to digital content or physical objects or even monetary rewards.

The reward generation sub-module 306 may be personalized for the user such that rewards can be generated for different types of user engagement for different users. For example, the reward generation sub-module 306 may generate rewards for simply clicking or, in case of a touch interface, touching any portion of the constructed environment for a user who has difficulty engaging with the behavior training user interface 112 at all.

As the user progresses though the training, the reward generation sub-module 306 may only generate rewards for clicks or touches on any portion of the constructed environment that is outside the image of the user within the constructed environment. Eventually, the reward generation sub-module 306 may only generate rewards when the user clicks or touches the stimulus object within the constructed environment.

The personalization module 206 may be trained to learn the user's progression and reward preferences to personalize when to reward the user and the type of reward generated for the user.

Figure 4:
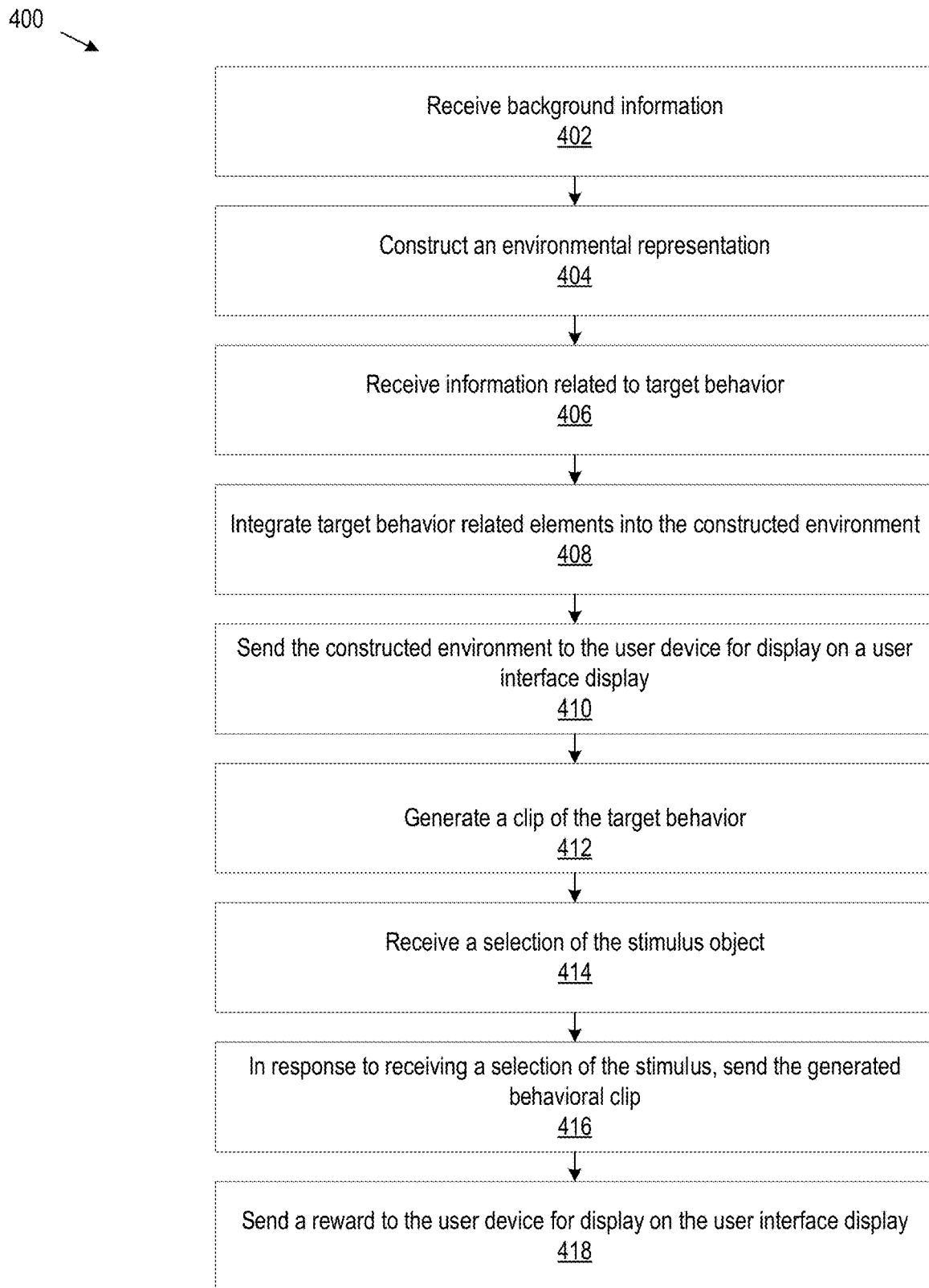
FIG. 4 illustrates an example method for learning a new behavior according to the present disclosure, and that can be performed using the system of FIG. 1.

FIG. 4 illustrates an example method 400 for learning a new behavior. In example operation 402, the background construction module 202 of the behavior training engine 110 may receive background data from the behavior training user interface 104 of the user electronic computing device 102. For example, the background data can include information related to the user, such as biographical, social, health, family related information, photographs of the user, information related to the user's therapist or caregiver, locations where the user spends their time, photographs of the locations, such as interior photographs of the user's room, photographs of other rooms within the user's residence, school, workplace, etc.

In example operation 404, the background construction module 202 of the behavior training engine 110 may construct an environment for display on the behavior training user interface 102 from the photographs or digital representations of the user and user's environment. For example, the constructed environment may be a realistic visual representation of the user and the user's environment instead of a cartoon or a caricature of the user and user's environment in order to allow the user to visualize themselves completing tasks. In some examples, the constructed environment may be saved in the data store 112 and/or the constructed environment may be sent to the user electronic computing device 102 for display on the behavior training user interface 104.

In example operation 406, the behavior construction module 204 of the behavior training engine 110 may receive information related to the target behavior from the behavior training user interface 104 of the user electronic computing device 102. For example, the target behavior information may be entered or selected by the user, or the user's therapist or caregiver, on the behavior training user interface 104. The target behavior information may include a selection of a target behavior the user is trying to achieve, or the user's therapist or caregiver would like him/her to achieve, from a pre-compiled list of target behaviors and photographs or digital representations of objects or locations associated with the target behavior. Other types of information related to target behaviors may also be received from the user electronic computing device 102, as will be readily apparent by those skilled in the pertinent field.

In example operation 408, the behavior construction module 204 of the behavior training engine 110 may integrate target behavior related elements into the constructed environment from operation 404. For example, the behavior integration sub-module 302 of the behavior construction module 204 may integrate elements associated with the target behavior into the constructed environment from operation 404. The process of integrating target behavior related elements into the constructed environment is described in greater detail in relation to the behavior integration sub-module 302.

In example operation 410, the behavioral construction module 204 of the behavior training engine 110 may send the integrated constructed environment from operation 406 to the user electronic computing device 102 for display on the behavior training user interface 104. For example, the behavior integration sub-module 302 may retrieve the integrated constructed environment, including the personalized prompt associated with the target behavior, that was stored in the data store 112 in operation 408 and send it to the user electronic computing device 102 for display on the behavior training user interface 104.

In example operation 412, the behavior construction module 204 of the behavior training engine 110 may generate a behavioral clip related to the target behavior. For example, the behavioral clip generation sub-module 304 of the behavior construction module 204 may generate a behavioral clip based on the user's image performing the beginning and ending steps associated with the target behavior. The behavioral clip generation sub-module 304 may use an image editing or video editing algorithm to generate a series of images or a short video snippet of the user's image within the constructed environment performing the beginning and ending steps of the target behavior. The intermediate steps are not included within the generated clip. Once the behavioral clip is generated, the behavioral clip generation sub-module 304 stores the generated clip in the data store 112. The generation of the behavioral clip is described in greater detail in relation to the behavioral clip generation sub-module 304 of FIG.

In example operation 414, the behavioral construction module 204 of the behavior training engine 110 may receive a selection of the stimulus object from the user electronic computing device 102 computing. The behavioral clip generation sub-module 304 may receive a selection of the stimulus object in response to the personalized prompt, wherein the selection is made by the user on the user electronic computing device 102 through the behavior training user interface 104. In an example, for a target behavior of sitting on a new chair, the image of the chair within the integrated constructed environment may serve as the stimulus object. Based on a personalized prompt displayed on the behavior training user interface 104, the user, or the user's therapist or caregiver, at the user electronic computing device 102 may select the image of the chair on the behavior training user interface 104.

In some examples, the selection may be completed when the user clicks on the image of the stimulus object using a mouse. In other examples, where the user electronic computing device 102 includes a touch sensitive display screen, the selection may be completed when the user touches the image of the stimulus object displayed on the behavior training user interface 104. The user's selection is sent from the user electronic computing device 102 to the behavioral clip generation sub-module 304 of the behavior training engine 110.

In example operation 416, the behavioral construction module 204 of the behavior training engine 110 may send the behavioral clip to the user electronic computing device 102 for display on the behavior training user interface 104. For example, in response to receiving a selection of the stimulus object, the behavioral clip generation sub-module 304 may retrieve the behavioral clip that was generated and stored in the data store 112 in operation 412 and send the generated behavioral clip to the user electronic computing device 102 for display on the behavior training user interface 104. Receiving the selection of the stimulus object by the user, or user's therapist or caregiver, in operation 414 may trigger the retrieval and sending of the behavioral clip in operation 416.

Once the user electronic computing device 102 receives the behavioral clip, the user electronic computing device 102 may cause the display and automatic playback of the behavioral clip on the behavior training user interface 104. The generation and playback of the behavioral clip is described in further detail in relation to the behavioral clip generation sub-module 304 of FIG. 3.

In example operation 418, the behavioral construction module 204 of the behavior training engine 110 may send a reward to the user electronic computing device 102 for display on the behavior training user interface 104. In some examples, upon receiving the selection of the stimulus object in operation 414, the reward generation sub-module 306 of the behavioral construction module 204 may generate one or more personalized rewards and send the one or more rewards to the user electronic computing device 102. In other examples, the reward generation sub-module 306 may pre-generate one or more personalized rewards and store the rewards in the data store 112 and upon receiving the selection of the stimulus object in operation 414, retrieve the personalized rewards from the data store 112 and send the one or more rewards to the user electronic computing device 102.

The one or more rewards may be personalized based on the types of rewards that positively reinforce the particular user to continue to progress in learning the target behavior, including if the user touches, selects or otherwise engages with any portion of the integrated constructed environment displayed within the behavior training user interface 104, if the user touches, selects or otherwise engages with any portion of the integrated constructed environment displayed within the behavior training user interface 104 outside the image of the user within the integrated constructed environment and/or if the user touches, selects or otherwise selects the stimulus object within the integrated constructed environment. The generation and personalization of the rewards are further described in relation to the reward generation sub-module 306 of FIG. 3.

FIGS. 5-8 illustrate example visual representations of the behavior training user interface 104 during different operations of the behavior training system associated with the target behavior of sitting in a new chair within a classroom environment.

Figure 5:
FIG. 5 illustrates an example visual representation of the behavior training user interface of FIG. 1 displaying a constructed environment.

FIG. 5 illustrates an example visual representation 500 of the behavior training user interface 104 displaying a constructed environment. The example visual representation 500 illustrates an image of the constructed environment 502 with the image of the user 504 overlayed over the environment. The visual representation 500 may be constructed by the background construction module 202 of the behavior training engine 110 and sent to the user electronic computing device 102 for display on the behavior training user interface 104 prior to the user selecting a target behavior.

The background construction module 202 may construct the image of the constructed environment 502 from one or more photographs or digital representations of the user's classroom to resemble the user's real-life classroom. The background construction module 202 may also construct the image of the user 504 from one or more photographs or digital representations of the user to resemble the user in real life. The background construction module 202 may overlay the image of the user over the image of the constructed environment in order to create a visual representation of the user within the constructed environment.

In some examples, the constructed environment may be defined by the target behavior itself. For example, for a target behavior related to potty training, the background construction module 202 may request that the user provide photographs or digital representations of a bathroom within the user's primary environment, such as the user's house.

Figure 6:
FIG. 6 illustrates an example visual representation of the behavior training user interface of FIG. 1 displaying a constructed environment that integrates elements associated with a selected target behavior.

FIG. 6 illustrates an example visual representation 600 of the behavior training user interface 104 displaying a constructed environment that integrates elements associated with a selected target behavior. The example visual representation 600 illustrates an image of the constructed environment 502 with the image of the user 504 and one or more target behavior elements 602 overlayed over the constructed environment 502.

For example, the background integration sub-module 302 of the behavior training engine 110, in operations 406-408 of FIG. 4, integrates one or more target behavior related elements into the constructed environment. The integrated constructed environment may include a stimulus object that when triggered in response to a prompt, causes the playback of a behavioral clip.

The example visual representation 600 is related to the target behavior of learning to sit in a new chair. In the example visual representation 600, the image of the chair serves as one of the one or more target behavior elements 602 as well as the stimulus object. Other configurations are also possible, as will be apparent to those skilled in the pertinent field.

Figure 7:
FIG. 7 illustrates an example visual representation of the behavior training user interface of FIG. 1 displaying a snippet of the behavioral clip.

FIG. 7 illustrates an example visual representation 700 of the behavior training user interface 104 displaying a snippet of the behavioral clip. The example visual representation 700 illustrates a snippet from a behavioral clip generated by the behavioral clip generation sub-module 304 of the behavior training engine 110 and sent to the user electronic computing device 102 for display on the behavior training user interface 104.

In the example visual representation 700, the snippet from the behavioral clip includes the end step associated with the target behavior that is part of the generated behavioral clip. The behavioral clip generated by the behavioral clip generation sub-module 304 for a target behavior related to sitting on a new chair includes a plurality of images or a video snippet that illustrates the beginning and ending steps of the target behavior. For example, the beginning step of the target behavior may include the user starting to turn towards the new chair and the ending step of the target behavior may include the user already sitting on the new chair.

In some examples, the generated behavioral clip may include two images, a first image of the image of the user turning towards the new chair and a second image of the image of the user sitting on the new chair. The example visual representation 700 displays the ending step of the target behavior, which includes the image of the user sitting on the new chair.

Figure 8:
FIG. 8 illustrates an example visual representation of the behavior training user interface of FIG. 1 displaying a reward.

FIG. 8 illustrates an example visual representation 800 of the behavior training user interface 104 displaying a reward. The example visual representation 800 illustrates a reward 802 that was generated by the reward generation sub-module 306 of the behavior training engine 110 and sent to the user electronic computing device 102 in response to a user triggering the selection of a stimulus object on the behavior training user interface 104.

The reward 802 in the example visual representation 800 includes a sticker of a fireman with a "thumb's up" signal. The reward 802 is personalized to provide the particular user with positive reinforcement. The process of generating rewards is described in further detail in relation to the reward generation sub-module 306 of FIG. 3.

FIG. 9 illustrates an example visual representation 900 of the behavior training user interface 104 displaying a modification to elements of the integrated constructed environment. The behavior training engine 110, using a machine learning model configured by the personalization module 206, learns the types of elements within the integrated constructed environment 902 that results in improved user engagement. For example, the personalization module 206 may predict that the user is likely to engage with the integrated constructed environment 902 and select the stimulus object 904 if the stimulus object 904 is increased in size. Based on the prediction generated by the personalization module 206, the behavior integration sub-module 302 may adjust the size of the stimulus object 904 within the constructed environment. Increasing the size of the stimulus object, in this case, the image of the new chair, may result in the user's attention being drawn towards the stimulus object 904 and the user selecting or otherwise engaging with the stimulus object 904.

FIG. 10 illustrates another example visual representation 1000 of the behavior training user interface 104 displaying another modification to elements of the integrated constructed environment. The behavior training engine 110, using a machine learning model configured by the personalization module 206, learns the types of elements within the integrated constructed environment 1002 that may distract the particular user from engaging with the stimulus object 1004. For example, elements within the integrated constructed environment 1002 may be removed in order to keep the particular user from getting distracted and focusing the user's attention on the stimulus object 1004. Removing the distracting elements from the integrated constructed environment may help to increase the chance that the particular user selects the stimulus object 1004. The personalization module 206 may predict the type of modification to the integrated constructed environment and/or stimulus object that would help increase engagement for a particular user. The personalization of the integrated constructed environment and stimulus objects is further described in relation to the personalization module 206 from FIG. 2.

For example, the personalization module 206, based on the user's past engagement with the behavior training user interface 104, may predict that the user may be distracted by any bright colored elements within the integrated constructed environment. The behavior construction module 204 may then remove all bright colored elements, other than the stimulus object, from the behavior training user interface 104.

In another example, based on the user's past engagement with the behavior training user interface 104, may predict that the user selects or engages with elements on the top right corner of the behavior training user interface 104. The behavior construction module 204 may then remove all background elements from the top right corner of the behavior training user interface 104. In some examples, the behavior construction module 204 may also move the stimulus object to the top right corner of the behavior training user interface 104 to increase the probability of the user engaging with the stimulus object.

Figure 11:
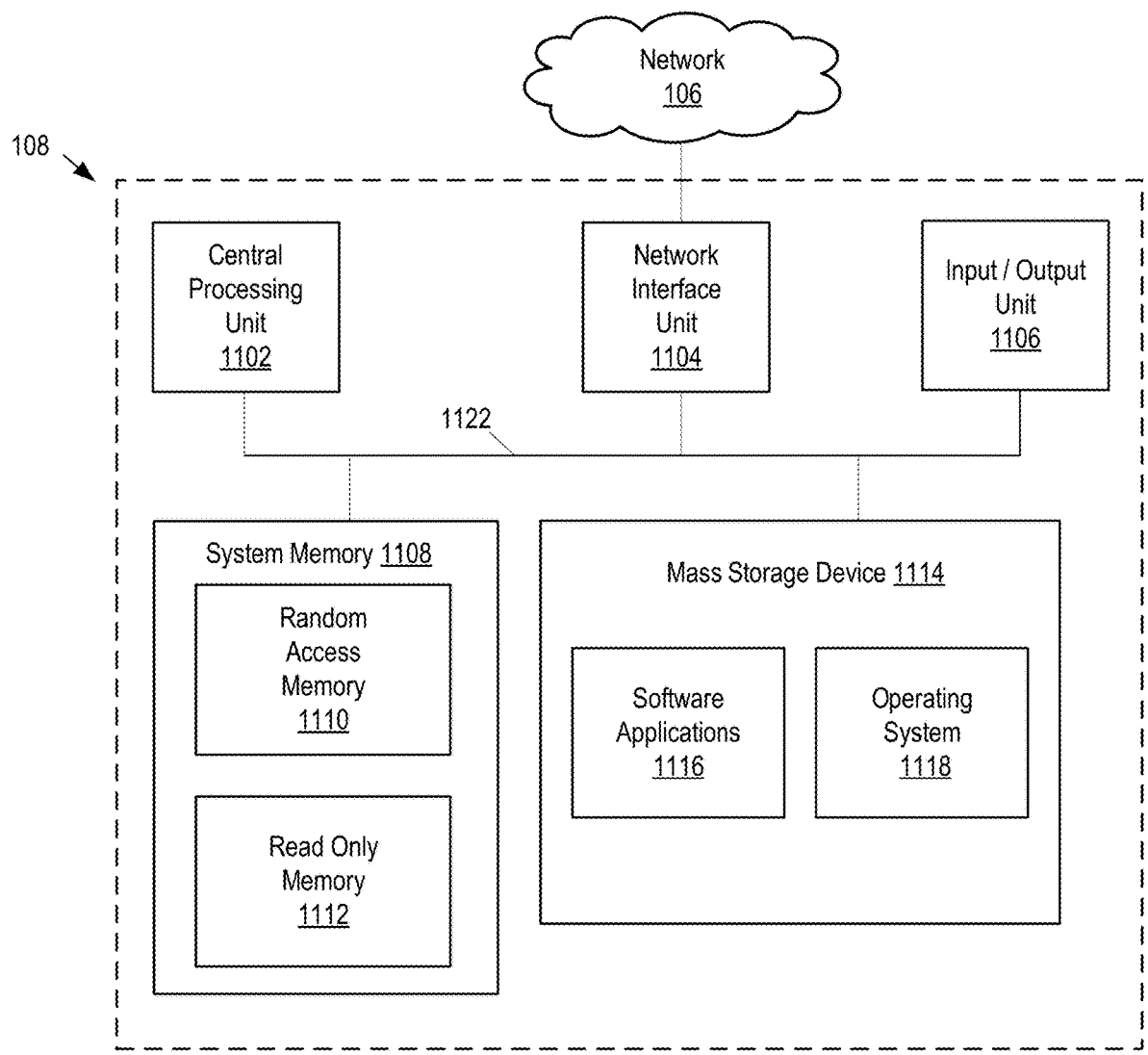
FIG. 11 illustrates example physical components of the computing devices of FIG. 1.

FIG. 11 illustrates example physical components of the computing devices of FIG. 1. As illustrated in the example of FIG. 11, the server computer 108 includes at least one central processing unit ("CPU") 1102, a system memory 1108, and a system bus 1122 that couples the system memory 1108 to the CPU 1102. The system memory 1108 includes a random-access memory ("RAM") 1110 and a read-only memory ("ROM") 1112. A basic input/output system that contains the basic routines that help to transfer information between elements within the server computer 108, such as during startup, is stored in the ROM 1112. The server computer 108 further includes a mass storage device 1114. The mass storage device 1114 is able to store software instructions and data 1116 associated with software applications 1116. Some or all of the components of the server computer 108 can also be included in user electronic computing device 102.

The mass storage device 1114 is connected to the CPU 1102 through a mass storage controller (not shown) connected to the system bus 1122. The mass storage device 1114 and its associated computer-readable data storage media provide non-volatile, non-transitory storage for the server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 108.

According to various embodiments of the invention, the server computer 108 may operate in a networked environment using logical connections to remote network devices through the network 106, such as a wireless network, the Internet, or another type of network. The server computer 108 may connect to the network 106 through a network interface unit 1104 connected to the system bus 1122. It should be appreciated that the network interface unit 1104 may also be utilized to connect to other types of networks and remote computing systems. The server computer 108 also includes an input/output controller 1106 for receiving and processing input from a number of other devices, including a touch user interface display screen, or another type of input device. Similarly, the input/output controller 1106 may provide output to a touch user interface display screen or other type of output device.

As mentioned briefly above, the mass storage device 1114 and the RAM 1110 of the server computer 108 can store software instructions and data associated with software applications 1116. The software instructions include an operating system 1118 suitable for controlling the operation of the server computer 108. The mass storage device 1114 and/or the RAM 1110 also store software instructions, that when executed by the CPU 1102, cause the server computer 108 to provide the functionality of the server computer 108 discussed in this document. For example, the mass storage device 1114 and/or the RAM 1110 can store software instructions that, when executed by the CPU 1102, cause the server computer 108 to display received data on the display screen of the server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer-implemented method for training a user on a target behavior, the method comprising:
    receiving, from a user electronic computing device, a selection of the target behavior;
    receiving, from the user electronic computing device, a photograph or a digital image of a stimulus object;
    constructing, based on the selection of the target behavior and the photograph or the digital image of the stimulus object, a visual representation of a user environment, wherein the visual representation of the user environment includes the stimulus object;
    sending, to the user electronic computing device, the constructed visual representation of the user environment, thereby causing the constructed visual representation to be displayed on a display device of the user electronic computing device;
    determining a sequence of steps for the target behavior;
    generating a behavioral video clip related to performing the target behavior, the behavioral video clip including a visualization of some but not all of the steps of the determined sequence of steps;
    receiving a selection of the stimulus object, the selection of the stimulus object being made via a prompt of the constructed visual representation of the user environment displayed on the display device of the user electronic computing device; and
    in response to receiving the selection of the stimulus object, sending, to the user electronic computing device, the generated behavioral video clip.

2. The computer-implemented method of claim 1, wherein the target behavior is an action or mannerism that the user or a caregiver of the user desires for the user to learn.

3. The computer-implemented method of claim 1, wherein constructing the visual representation of the user environment includes:
    receiving one or more photographs or digital images of a real-life environment of the user, wherein the one or more photographs or digital images of the real-life environment includes one or more background elements;
    receiving one or more photographs or digital images of the user; and
    generating the visual representation of the user environment by:
        overlaying an image of the user and an image of the stimulus object over an image of the real-life environment, the stimulus object being associated with the target behavior, wherein:
            the image of the user is generated from the one or more photographs or digital images of the user;
            the image of the stimulus object is generated from the photograph or the digital image of the stimulus object and
            the image of the real-life environment is generated from the one or more photographs or digital images of the real-life environment.

4. The computer-implemented method of claim 3, wherein the one or more photographs or digital images of the user's real-life environment includes one or more photographs or digital images of a location that the user occupies.

5. The computer-implemented method of claim 3, further comprising removing at least one of the one or more background elements from the image of the real-life environment based on a level of engagement that the user exhibits with the image of the stimulus object overlayed on the image of the real-life environment.

6. The computer implemented method of claim 1, further comprising:
    storing the generated behavioral video clip in a data store; and
    in response to receiving the selection of the stimulus object, retrieving the generated behavioral video clip from the data store.

7. The computer-implemented method of claim 1, further comprising:
    in response to receiving the selection of the stimulus object, sending one or more rewards to the user electronic computing device.

8. The computer implemented method of claim 7, wherein at least one of: the visual representation of the user environment, the stimulus object and the one or more rewards is based on personal preferences of the user.

9. A system for training a user on a target behavior, the system comprising:
    a processor; and
    memory comprising instructions that when executed by the process causes the processor to:
        receive, from a user electronic computing device, a selection of the target behavior;
        receive, from the user electronic computing device, a photograph or a digital image of a stimulus object;

construct, based on the selection of the target behavior and the photograph or the digital image of the stimulus object, a visual representation of a user environment, wherein the visual representation of the user environment includes the stimulus object;

send, to the user electronic computing device, the constructed visual representation of the user environment, thereby causing the constructed visual representation to be displayed on a display device of the user electronic computing device;

determine a sequence of steps for the target behavior;

generate a behavioral video clip related to performing the target behavior, the behavioral video clip including a visualization of some but not all of the steps of the determined sequence of steps;

receive a selection of the stimulus object, the selection of the stimulus object being made via a prompt of the constructed visual representation of the user environment displayed on the display device of the user electronic computing device; and in response to receiving the selection of the stimulus object, send, to the user electronic computing device, the generated behavioral video clip.

10. The system of claim 9, wherein the target behavior is an action or mannerism that the user or a caregiver of the user desires for the user to learn.

11. The system of claim 9, wherein to construct the visual representation of the user environment includes to:
receive one or more photographs or digital images of a real-life environment of the user;
receive one or more photographs or digital images of the user; and
generate the visual representation of the user environment by:
overlaying an image of the user and an image of the stimulus object over an image of the real-life environment, the stimulus object being associated with the target behavior, wherein:
the image of the user is generated from the one or more photographs or digital images of the user;
the image of the stimulus object is generated from the photograph or digital image of the stimulus object; and
the image of the real-life environment is generated from the one or more photographs or digital images of the real-life environment.

12. The system of claim 11, wherein the one or more photographs or digital images of the real-life environment includes one or more photographs or digital images of a location that the user occupies.

13. The system of claim 11, wherein the instructions, when executed by the processor, further cause the processor to:
remove at least one of the one or more background elements from the image of the real-life environment based on a level of engagement that the user exhibits with the image of the stimulus object overlayed on the image of the real-life environment.

14. The system of claim 9, wherein the instructions, when executed by the processor, further cause the processor to:
store the generated behavioral video clip in a data store; and
in response to receiving the selection of the stimulus object, retrieve the generated behavioral video clip from the data store.

15. The system of claim 9, wherein the instructions, when executed by the processor, further cause the processor to:
in response to receiving the selection of the stimulus object, send one or more rewards to the user electronic computing device.

16. The system of claim 15, wherein at least one of: the visual representation of the user environment, the stimulus object and the one or more rewards is based on personal preferences of the user.

17. A system for training a user on a target behavior, the system comprising:
a display device;
a processor;
memory comprising instructions that when executed by the process causes the processor to:
send a photograph or a digital image of a stimulus object to a server computing device;
display a behavior training user interface on the display device that includes one or more user selectable options associated with the target behavior;
receive, from the user, one or more selections associated with the target behavior;
send the one or more selections associated with the target behavior to the server computing device;
receive, from the server computing device and based on the selections and the photograph or the digital image of the stimulus object, a constructed visual representation of a user environment, wherein the constructed visual representation of the user environment includes the stimulus object;
display, on the display device, the constructed visual representation of the user environment and a prompt requesting the user to trigger the stimulus object;
receive, from the user, a selection of the stimulus object;
send the selection of the stimulus object to the server computing device;
in response to sending the selection of the stimulus object, receive a behavioral video clip related to performing the target behavior, wherein the behavioral video clip does not include content related to performing all steps of the target behavior;
display and cause the automatic playback of the behavioral video clip on the display device;
in response to the selection of the stimulus object, receive one or more rewards; and
display the one or more rewards on the display device.

18. The system of claim 17, wherein the at least one of: the constructed visual representation of the user environment, the stimulus object, the prompt and the one or more rewards is personalized to the user.

19. The system of claim 17, wherein the constructed visual representation of the user environment is constructed by overlaying an image of the user and an image of the stimulus object over an image of an environment of the user.

20. The system of claim 19,
wherein the image of the user is generated from one or more photographs or digital images of the user;
wherein the image of the stimulus object is generated from one or more photographs or digital images of the stimulus object; and
wherein the image of the environment of the user is generated from one or more photographs or digital images of the environment of the user.

* * * * *

UNITED STATES PATENT AND TRADEMARK OFFICE
CERTIFICATE OF CORRECTION

PATENT NO. : 12,067,893 B2
APPLICATION NO. : 17/966514
DATED : August 20, 2024
INVENTOR(S) : Rinat Hitelman et al.

Page 1 of 1

It is certified that error appears in the above-identified patent and that said Letters Patent is hereby corrected as shown below:

In the Claims

Column 22, Claim 3, Line 29: "object and" should read --object; and--

Column 22, Claim 6, Line 43: "computer implemented" should read --computer-implemented--

Column 22, Claim 8, Line 55: "computer implemented" should read --computer-implemented--

Column 22, Claim 9, Line 63: "the process causes the processor to:" should read --the processer causes the processor to:--

Column 24, Claim 17, Line 13: "a processor," should read --a processor; and--

Column 24, Claim 17, Line 15: "the process causes the processor to:" should read --the processer causes the processor to:--

Signed and Sealed this
Twenty-ninth Day of July, 2025

Coke Morgan Stewart
*Acting Director of the United States Patent and Trademark Office*